(12) United States Patent
Slagle

(10) Patent No.: US 8,253,102 B1
(45) Date of Patent: Aug. 28, 2012

(54) GASEOUS FOCAL PLANE THERMAL IMAGER

(75) Inventor: Glenn B. Slagle, McLean, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 500 days.

(21) Appl. No.: 12/570,168

(22) Filed: Sep. 30, 2009

(51) Int. Cl.
*H01L 25/00* (2006.01)
(52) U.S. Cl. ....................................... 250/332
(58) Field of Classification Search ........... 250/331, 250/332
See application file for complete search history.

(56) References Cited

U.S. PATENT DOCUMENTS

| | | | |
|---|---|---|---|
| 4,275,302 A * | 6/1981 | Imbert et al. | 250/330 |
| 5,473,448 A | 12/1995 | Yoshinaga et al. | |
| 5,602,679 A | 2/1997 | Dolgoff et al. | |
| 5,900,982 A | 5/1999 | Dolgoff et al. | |
| 6,181,416 B1 | 1/2001 | Falk | |
| 7,535,617 B2 * | 5/2009 | Gupta et al. | 359/285 |

OTHER PUBLICATIONS

R. Aaron Falk, "Backside Thermal Mapping Using Active Laser Probe," Electronic Device Failure Analysis News, May 2000 (See, also, http://www.optomet.com/pdfs/Backside_Thermal_Mapping.pdf).

* cited by examiner

*Primary Examiner* — David Porta
*Assistant Examiner* — Hugh H Maupin
(74) *Attorney, Agent, or Firm* — Richard J. Kim

(57) ABSTRACT

A thermal imager including a cell containing a fluid whose refractive index varies with temperature and, optical components for focusing the infrared image of a scene to be viewed onto the cell to produce local temperature differences across the fluid. The local temperature differences give rise to local refractive index differences. The thermal imager also includes a Schlieren optical system for reading out the local refractive index differences to reproduce the scene.

19 Claims, 4 Drawing Sheets

GASEOUS FOCAL PLANE THERMAL IMAGER

GOVERNMENT INTEREST

The invention described herein may be manufactured, used, sold, imported, and/or licensed by or for the Government of the United States of America.

FIELD OF THE INVENTION

This invention relates in general to thermal imagers, and more particularly, to hyper-spectral imagers.

BACKGROUND OF THE INVENTION

Staring array imagers use a solid semiconductor focal plane surface to generate a television-type thermal image display. The focal plane surfaces are extremely thin and may be subject to permanent thermal shock damage from excessive thermal energy. Since these focal planes are relatively expensive to fabricate, a new type of self-healing focal plane array lower in cost is desirable.

SUMMARY OF THE INVENTION

It is therefore an object of this invention to provide a more damage-resistant staring thermal imager than is available in the current art.

This and other objects of the invention are achieved in one aspect by an improved thermal imager. The thermal imager includes a cell containing a fluid whose refractive index varies with temperature, means for focusing the infrared image of a scene to be viewed onto the cell to produce local temperature differences across the fluid which give rise to local refractive index differences, and means for reading out the local refractive index differences to reproduce the scene.

Another aspect of the invention involves an improved method of generating thermal images comprising the steps of providing a cell containing a fluid whose refractive index varies with temperature, focusing the infrared image of a scene to be viewed onto the cell to produce local temperature differences across the fluid, the local temperature differences giving rise to local refractive index differences, and reading out the local refractive index differences to reproduce the scene.

Additional advantages and features will become apparent as the subject invention becomes better understood by reference to the following detailed description when considered in conjunction with the accompanying drawings wherein.

DETAILED DESCRIPTION

Figure 1:
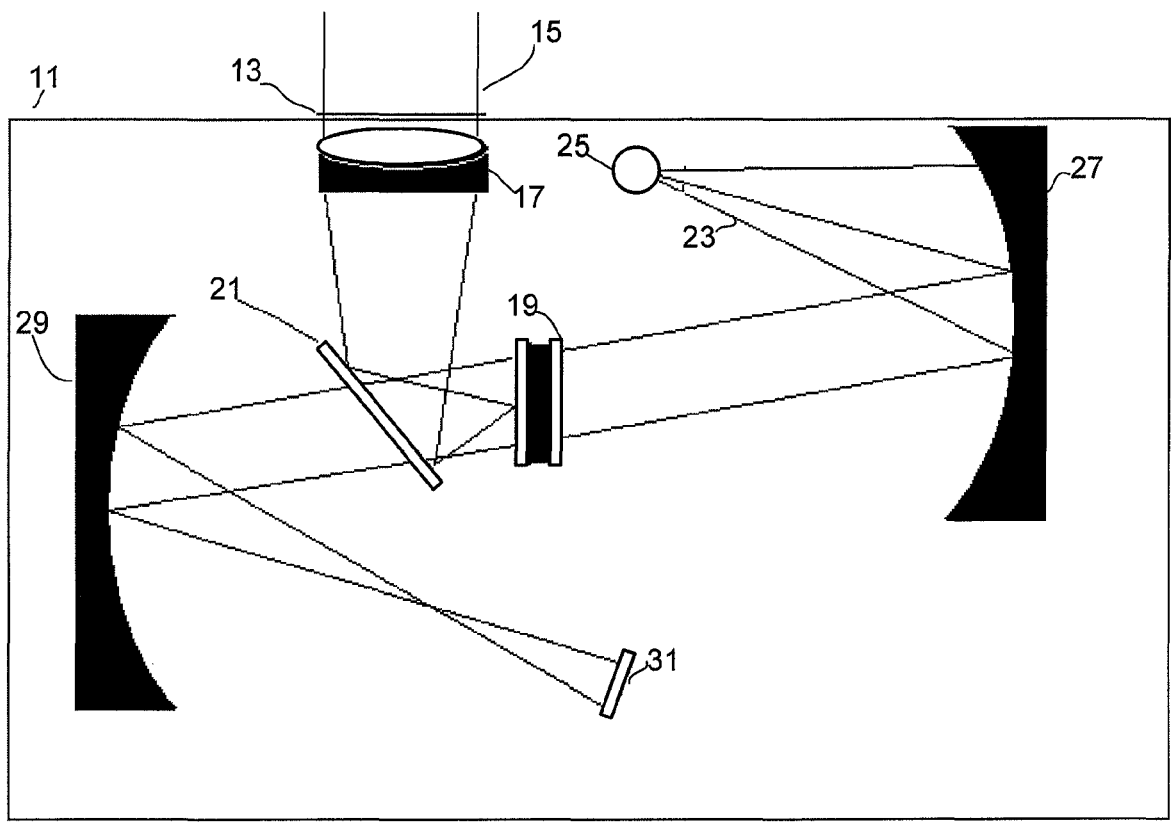
FIG. 1 is a schematic illustration of a first embodiment of a thermal imager embodying the invention.

Referring to the drawing, wherein like reference numerals designate like or corresponding parts, FIG. 1 shows a first embodiment of the thermal imager. The optical components of the thermal imager are enclosed in an airtight container 11 with an IR-transparent window 13. The container 11 is either evacuated or filled with a dry non-IR-absorbing gas such as Nitrogen. IR light 15 from a scene to be viewed enters the window 13 and is focused by means for focusing, e.g., an LWIR/MWIR objective lens 17 onto a thin optical cell 19, after being reflected off a dichloric (visible/NIR transmitting, SWIR/LWIR reflecting) beam splitter 21. The optical cell 19 has entrance and exit windows that are LWIR/MWIR as well as visible/NIR transparent. The optical cell 19 contains an IR-absorbing, but optically-transparent fluid, such as the gas Sulfur Hexafluoride, with IR absorption characteristics consistent with the desired IR image wavelength pass-band (and optical/NIR transparency characteristics consistent with visible/NIR optical readout). The IR energy from the scene to be viewed that is focused on the fluid in the optical cell 19 gives rise to local temperature differences across the optical cell corresponding to the focused IR light image of the scene to be viewed. These local temperature differences give rise in turn to local optical refractive index differences. The resulting optical refractive index map in the cell is then read out by means of a Schlieren optical system wherein a parallel beam of visible/NIR light 23 is passed through the optical cell 19 from a point source illuminator 25 and a collimating mirror 27, and then focused with a secondary objective mirror 29, after traversing the beam splitter 21, onto a visible/NIR, CCD or CMOS camera focal plane array 31 which transforms the image of the scene to be viewed into a suitable electronic format for computer or TV presentation. The use of Schlieren optical systems to optically read out a high-resolution thermal refractive index map is well known in the art and is disclosed in U.S. Pat. No. 6,181,416 to Falk, and in the article R. Aaron Falk, "Backside Thermal Mapping Using Active Laser Probe," Electronic Device Failure Analysis News, May 2000, the disclosures of which are hereby incorporated by reference.

Figure 2:
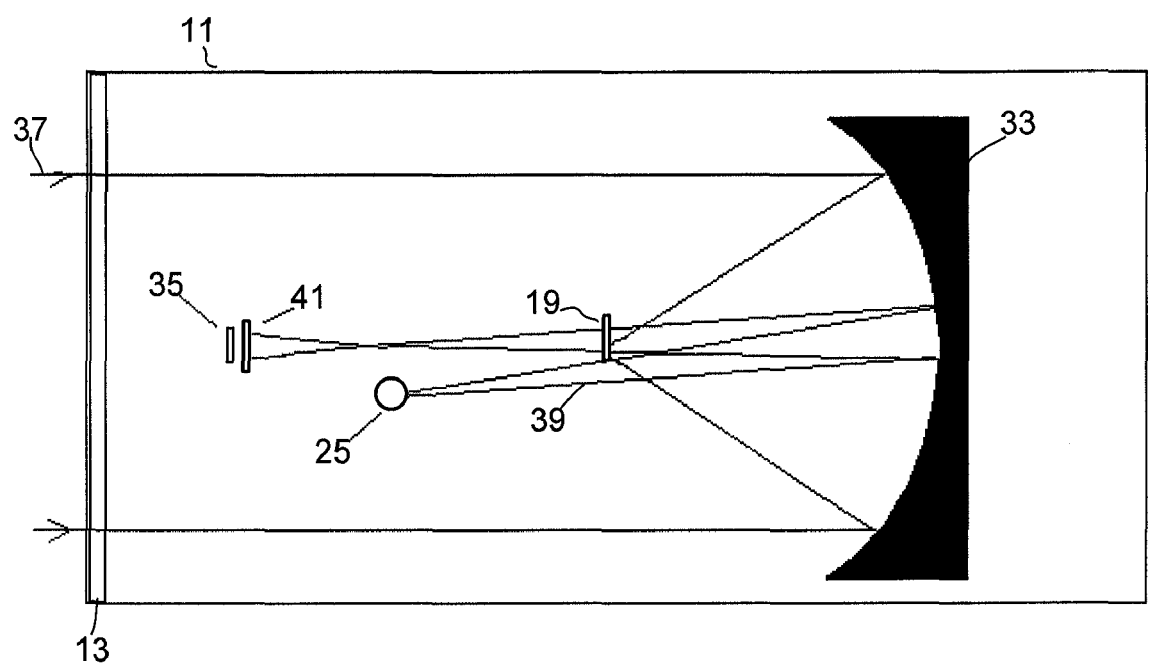
FIG. 2 is a schematic illustration of a second embodiment of a thermal imager embodying the invention.

FIG. 2 shows a second embodiment of the thermal imager which differs from the first embodiment by the substitution of a single spherical or parabolic mirror 33 for the collimating mirror 27, the secondary objective mirror 29, and the beam splitter 21, in order to greatly simplify the optical system. As with the first embodiment, the total optical system can be enclosed in a gas-tight container 11, but with a larger IR-transparent window 13. The container 11 is either evacuated or filled with a dry, SWIR-LWIR-transparent gas such as Nitrogen. A visible or NIR emitting point source 25 is positioned slightly off axis of the mirror 33 at or near its radius (twice the focal length). A visible/NIR focal plane imager 35 is placed slightly off axis (and at a distance greater that the mirror radius) such that the reflected point source light will pass through an optical cell 19 and also such that the image blur circle of the point source 25 is sufficient to fill the entire focal plane imager 35. The optical cell 19 is also placed slightly off the mirror axis such that the reflected point source light will pass through the optical cell, but not the direct light traveling to the mirror 33. The design of this optical system is therefore a compromise between off-axis image quality at the mirror focal plane, the desired diameter of the optical cell and the size of the focal plane array, the object being to avoid mechanical interference and light obstruction between the point source 25 and the visible/NIR focal plane imager 35.

In operation, IR light 37 from the scene to be viewed passes through the IR transparent window 13 and is focused by means for focusing, e.g., the mirror 33 on the optical cell 19. The resulting optical refractive index map is read out by means of light 39 emitted by the visible or NIR-emitting point source 25 which is reflected off the mirror 33, passes through the optical cell 19, and is intercepted by the visible/NIR focal plane imager 35. The focal plane imager 35 may optionally have a pass-band filter 41 placed just in front of it, as shown. The purpose of this filter is to pass only the near IR or visible narrowband wavelength emitted by the point source 25, and to block any other wavelengths, thereby reducing the cost, band-pass, and material requirements of the larger entrance window 13.

Figure 3:
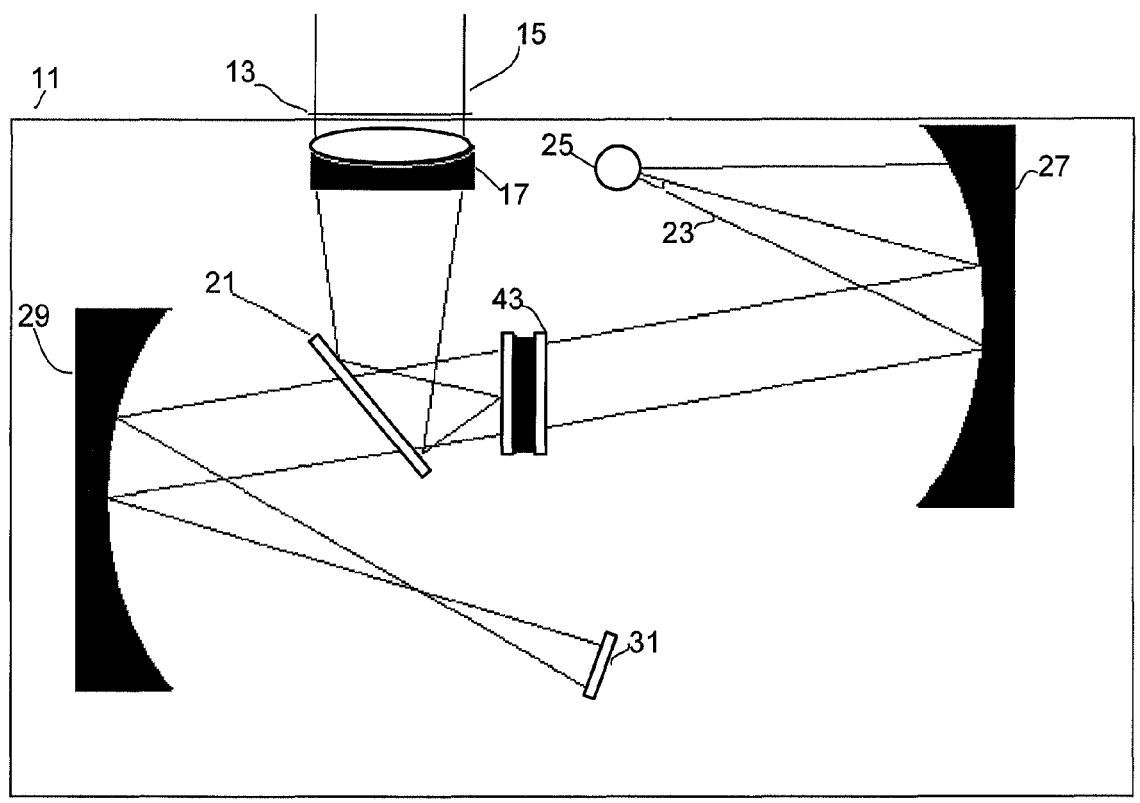
FIG. 3 is a schematic illustration of a third embodiment of a thermal imager embodying the invention.

FIG. 3 shows a third embodiment of the thermal imager which differs from the first embodiment by the substitution of a Bragg cell 43 for the optical cell 19. That is, optical components of the thermal imager can be enclosed in an airtight container 11 with an IR-transparent window 13. The container 11 can be either evacuated or filled with a dry non-IR-absorbing gas such as Nitrogen. IR light 15 from a scene to be viewed enters the window 13 and is focused by means for focusing, e.g., an LWIR/MWIR objective lens 17 onto a Bragg cell 43, after being reflected off a dichloric (visible/NIR transmitting, SWIR/LWIR reflecting) beam splitter 21. Further, a parallel beam of visible/NIR light 23 can be passed through the Bragg cell 43 from a point source illuminator 25 and a collimating mirror 27, and then focused with a secondary objective mirror 29, after traversing the beam splitter 21, onto a visible/NIR, CCD or CMOS camera focal plane array 31 which transforms the image of the scene to be viewed into a suitable electronic format for computer or TV presentation.

Figure 4:
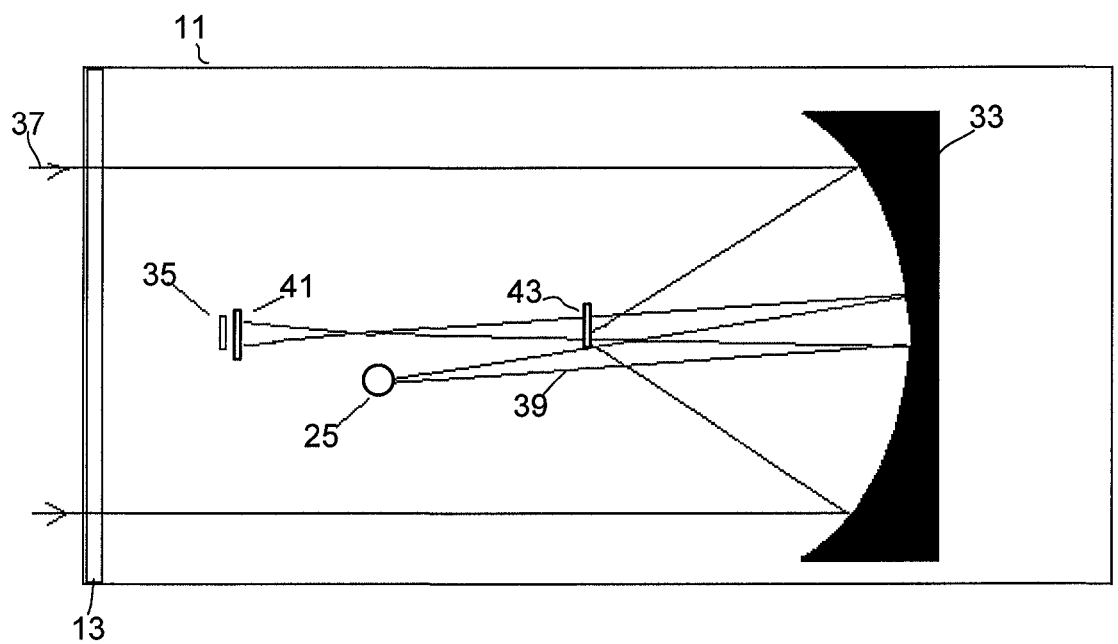
FIG. 4 is a schematic illustration of a fourth embodiment of a thermal imager embodying the invention.

FIG. 4 shows a fourth embodiment of the thermal imager which differs from the second embodiment by the substitution of a Bragg cell 43 for the optical cell 19. That is, the total optical system can be enclosed in a gas-tight container 11, but with a larger IR-transparent window 13. The container 11 can be either evacuated or filled with a dry, SWIR-LWIR-transparent gas such as Nitrogen. A visible or NIR emitting point source 25 is positioned slightly off axis of means for focusing, e.g., the mirror 33, at or near its radius (twice the focal length). A visible/NIR focal plane imager 35 is placed slightly off axis (and at a distance greater that the mirror radius) such that the reflected point source light will pass through a Bragg cell 43 and also such that the image blur circle of the point source 25 is sufficient to fill the entire focal plane imager 35. The Bragg cell 43 can also be placed slightly off the mirror axis such that the reflected point source light will pass through the optical cell, but not the direct light traveling to the mirror 33. The resulting optical refractive index map can be read out by means of light 39 emitted by the visible or NIR-emitting point source 25 which is reflected off the mirror 33, passes through the Bragg cell 43, and is intercepted by the visible/NIR focal plane imager 35. The focal plane imager 35 may optionally have a pass-band filter 41 placed just in front of it, as shown.

In both the third and the fourth embodiments, the IR energy from the scene to be viewed that is focused on the Bragg cell gives rise to local temperature differences across the cell corresponding to the focused IR light image of the scene to be viewed. These local temperature differences give rise in turn to local acoustic refractive index differences. The resulting acoustic refractive index map in the cell is then read out by means of the Schlieren optical system. The temperature-induced variation of the acoustic refractive index of a fluid such as air is well known to be roughly a million times greater than the corresponding optical refractive index variation, mainly due to the difference between the speeds of light and sound. Therefore, the third and fourth embodiments produce a greatly enhanced refractive index map to be read out by the Schlieren optical system.

It is obvious that many modifications and variations of the present invention are possible in light of the above teachings. It is therefore to be understood that within the scope of the appended claims, the invention may be practiced otherwise than as described.

What is claimed is:

1. A thermal imager comprising:
a cell containing an IR-absorbing optically transparent gas whose refractive index varies with temperature;
means for focusing the infrared image of a scene to be viewed onto the cell to produce local temperature differences across the IR-absorbing optically transparent gas, the local temperature differences giving rise to local refractive index differences; and
means for reading out the local refractive index differences to reproduce the scene.

2. The thermal imager recited in claim 1, wherein the cell is an optical cell and the refractive index is the optical refractive index.

3. The thermal imager recited in claim 1, wherein the focusing means includes:
an objective lens.

4. The thermal imager recited in claim 1, wherein the reading means includes:
a point source illuminator.

5. The thermal imager recited in claim 1, wherein the reading means includes:
a collimating mirror.

6. The thermal imager recited in claim 1, wherein the reading means includes:
a secondary objective minor.

7. The thermal imager recited in claim 1, wherein the reading means includes:
a camera focal plane array.

8. The thermal imager recited in claim 1, wherein the focusing means includes:
a mirror.

9. The thermal imager recited in claim 1, wherein the reading means includes:
a focal plane imager.

10. The thermal imager recited in claim 1, wherein the reading means includes:
a pass-band filter.

11. A thermal imager comprising:
a Bragg cell whose acoustic refractive index varies with temperature;
means for focusing the infrared image of a scene to be viewed onto the cell to produce local temperature differences across the cell, the local temperature differences giving rise to local acoustic refractive index differences; and
a Schlieren optical system spaced from the cell for reading out the local acoustic refractive index differences to reproduce the scene.

12. A method of generating thermal images comprising:
providing a cell containing at least sulfur hexafluoride as an IR-absorbing optically transparent gas whose refractive index varies with temperature;
focusing the infrared image of a scene to be viewed onto the cell to produce local temperature differences across the cell, the local temperature differences giving rise to local refractive index differences; and
reading out the local refractive index differences to reproduce the scene.

13. The method recited in claim 12, wherein the infrared image is focused by passing light from the scene to be viewed through an objective lens.

14. The method recited in claim 12, wherein the refractive index differences are read out by passing a parallel beam of light through the cell.

15. The method recited in claim 14, wherein the refractive index differences are read out by focusing the light that was passed through the cell onto a focal plane array.

16. The method recited in claim 12, wherein the infrared image is focused by passing light from the scene to be viewed through an objective lens.

17. The method recited in claim 12, wherein the infrared image is focused by reflecting light from the scene to be viewed from a mirror.

18. The method recited in claim 12, wherein the refractive index differences are read out by reflecting a beam of light from a point source off a mirror and through the cell.

19. The method recited in claim 18, wherein the refractive index differences are read out by intercepting the light that was passed through the cell with a focal plane imager.

* * * * *